United States Patent
Lu

(10) Patent No.: US 12,239,900 B2
(45) Date of Patent: Mar. 4, 2025

(54) CONTROL ASSEMBLY FOR PORTABLE ELECTRONIC DEVICE

(71) Applicant: DEXIN CORP., New Taipei (TW)

(72) Inventor: Ho Lung Lu, New Taipei (TW)

(73) Assignee: DEXIN CORP., New Taipei (TW)

( * ) Notice: Subject to any disclaimer, the term of this patent is extended or adjusted under 35 U.S.C. 154(b) by 324 days.

(21) Appl. No.: 17/890,029

(22) Filed: Aug. 17, 2022

(65) Prior Publication Data

US 2023/0256330 A1 Aug. 17, 2023

(30) Foreign Application Priority Data

Feb. 16, 2022 (TW) .................................. 111105569

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09); *A63F 2300/1043* (2013.01)

(58) Field of Classification Search
None
See application file for complete search history.

(56) References Cited

U.S. PATENT DOCUMENTS

2021/0197076 A1* 7/2021 Pelissier ................. A63F 13/98
2023/0182011 A1* 6/2023 Vroom .................... A63F 13/77
463/39

* cited by examiner

*Primary Examiner* — Damon J Pierce
(74) *Attorney, Agent, or Firm* — Maschoff Brennan

(57) ABSTRACT

A control assembly is adapted for an electronic device and includes two controllers and a link mechanism, the two controllers are configured to be removably installed on the electronic device, the link mechanism includes a retractable mechanism receptacle and two flexible parts, the two controllers are connected to the retractable mechanism receptacle respectively via the two flexible parts, and at least part of each of the two flexible parts is retractably accommodated in the retractable mechanism receptacle.

8 Claims, 6 Drawing Sheets

CONTROL ASSEMBLY FOR PORTABLE ELECTRONIC DEVICE

CROSS-REFERENCE TO RELATED APPLICATIONS

This non-provisional application claims priority under 35 U.S.C. § 119(a) on Patent Application No(s). 111105569 filed in Taiwan (R.O.C.) on Feb. 16, 2022, the entire contents of which are hereby incorporated by reference.

TECHNICAL FIELD

The disclosure relates to a control device, more particularly related to a control assembly for portable electronic device.

BACKGROUND

In recent years, with the development of science and technology, people can play various games on smartphones. Meanwhile, the smartphone's screen trend is changed from physical keyboard to touch screen, thus smartphone games are mostly designed to be touchscreen-based. Even though there is a virtual controller shown on screen, it is very inconvenient to play because the virtual controller hides some part of the screen and lacks tactile feedback.

To this end, smartphone-based controllers are developed to provide physical buttons for users to run games smoothly. However, the conventional smartphone-based controllers are large in size and unable to fit into small space.

SUMMARY

Accordingly, one aspect of the disclosure is to provide a control assembly capable of folded into a smaller size and therefore is more portable.

One embodiment of the disclosure provides a control assembly adapted for an electronic device and including two controllers and a link mechanism, the two controllers are configured to be removably installed on the electronic device, the link mechanism includes a retractable mechanism receptacle and two flexible parts, the two controllers are connected to the retractable mechanism receptacle respectively via the two flexible parts, and at least part of each of the two flexible parts is retractably accommodated in the retractable mechanism receptacle.

According to the control assembly as discussed in the above embodiments of the disclosure, the controllers, which are able to be installed on a portable electronic device, are connected to each other by the link mechanism and the link mechanism has flexible parts retractably stored in the retractable mechanism receptacle, thus the distance between the controllers is adjustable to adopt lengths of different electronic devices, and the control assembly is able to be transformed into a smaller and more portable size by folding the flexible parts and changing the relationships between the controllers and the link mechanism.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Figure 1:
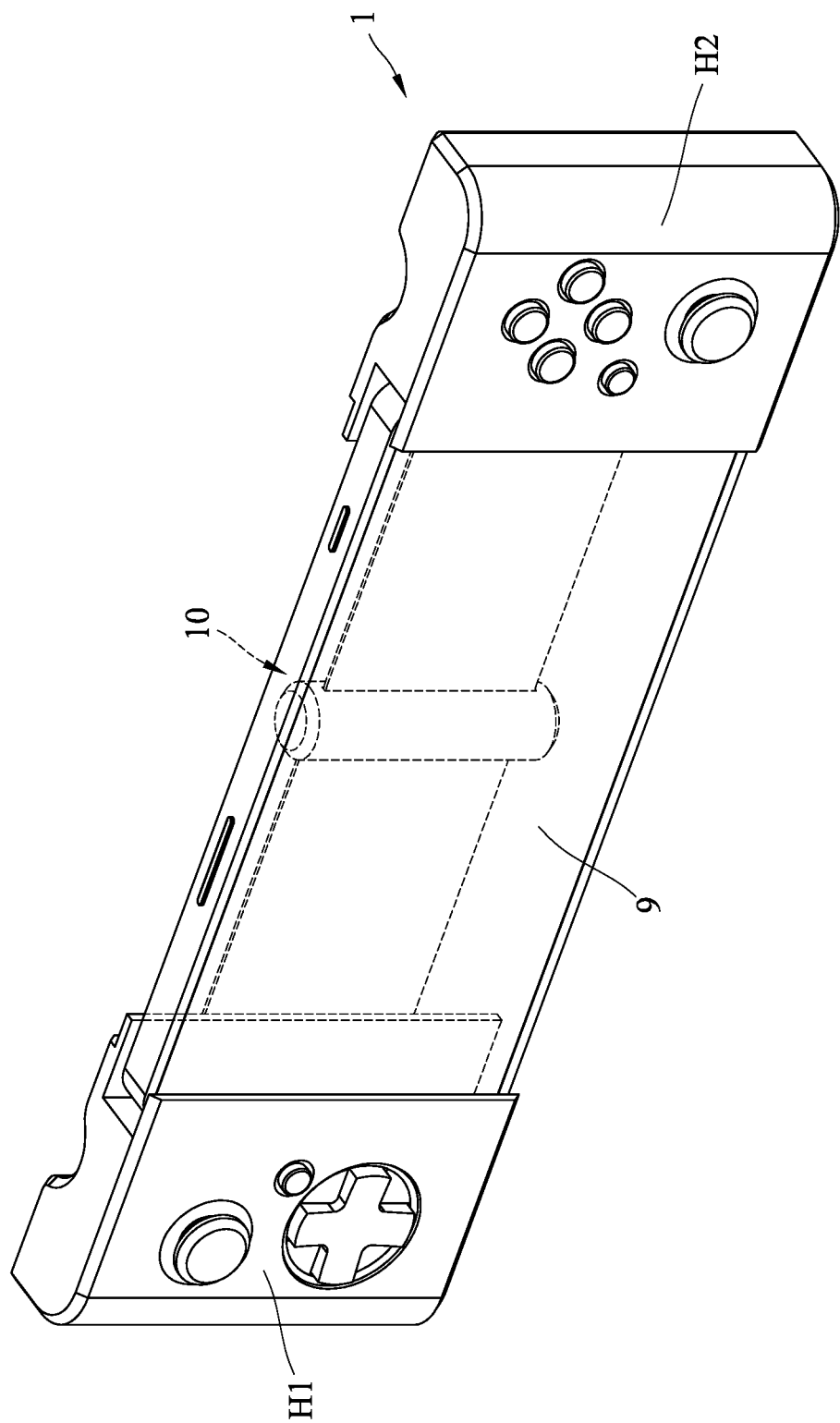
FIG. 1 is a perspective view of a control assembly according to one embodiment of the disclosure when an electronic device is applied thereon.

Firstly, referring to FIG. 1, one embodiment of the disclosure provides a control assembly 1 configured to be installed on a portable electronic device 9 (also called "electronic device" hereinafter). The electronic device 9 may be any typical smartphone or tablet and is not intended to limit the disclosure. The control assembly 1 may be in communication with the electronic device 9 via a wired or wireless manner and therefore becomes an approach for user to control the electronic device 9.

The control assembly 1 may include a link mechanism 10 and two controllers (e.g., a controller H1 and a controller H2 as shown). The controllers H1 and H2 are respectively removably installed on two opposite sides of the electronic device 9 and configured for user to hold in hands and to operate the electronic device 9. Optionally, the controllers H1 and H2 may each have one or more buttons (not numbered) thereon for the operation of the electronic device 9. It is noted that the design and number of the button on each controller are provided for better understand the disclosure but not intended to limit the disclosure. The link mechanism 10 is connected between the controllers H1 and H2 and allows the position adjustment of the controllers H1 and H2 relative to each other.

Figure 2:
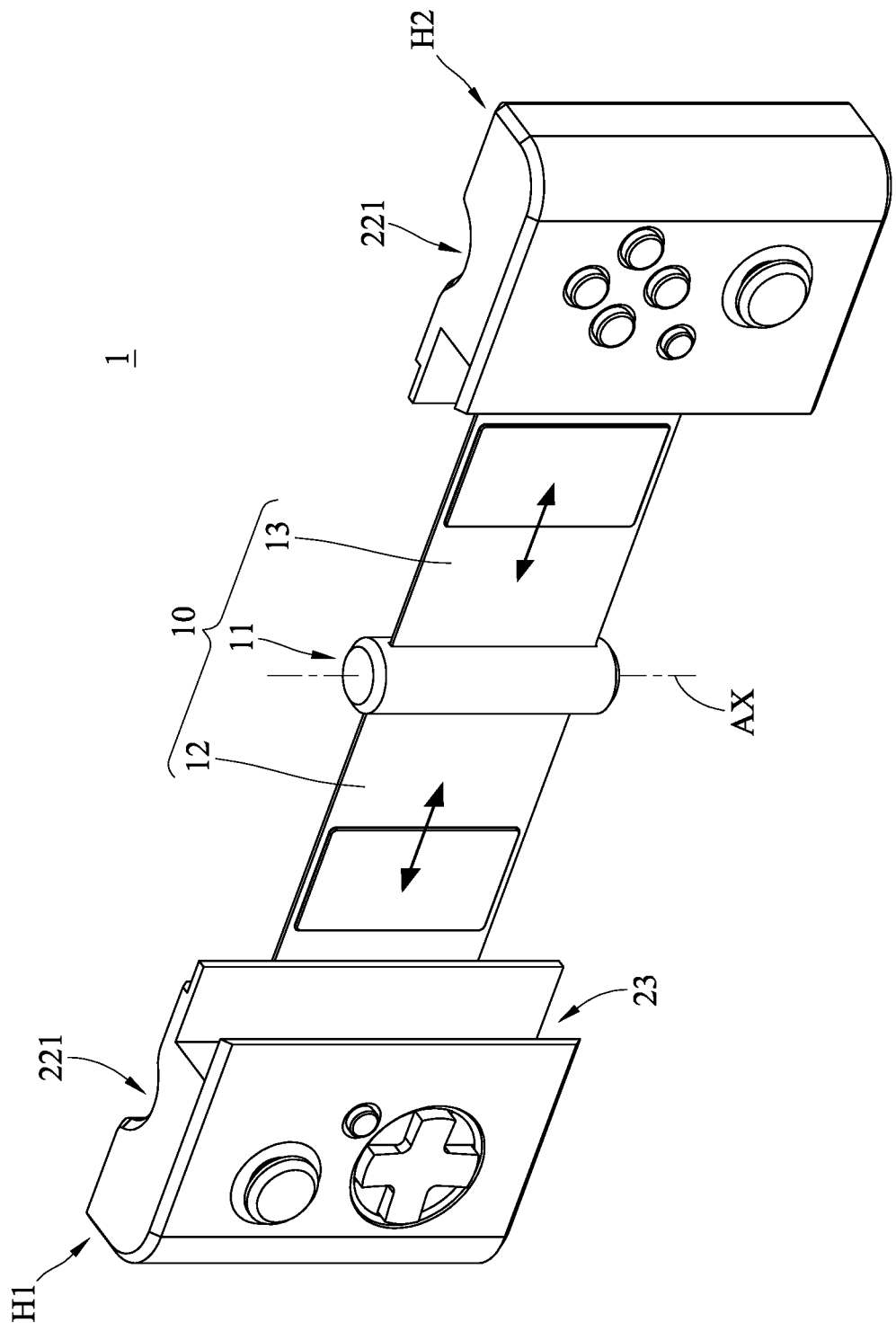
FIG. 2 is a perspective view of a control assembly according to one embodiment of the disclosure when in an in-use status.
Figure 3:
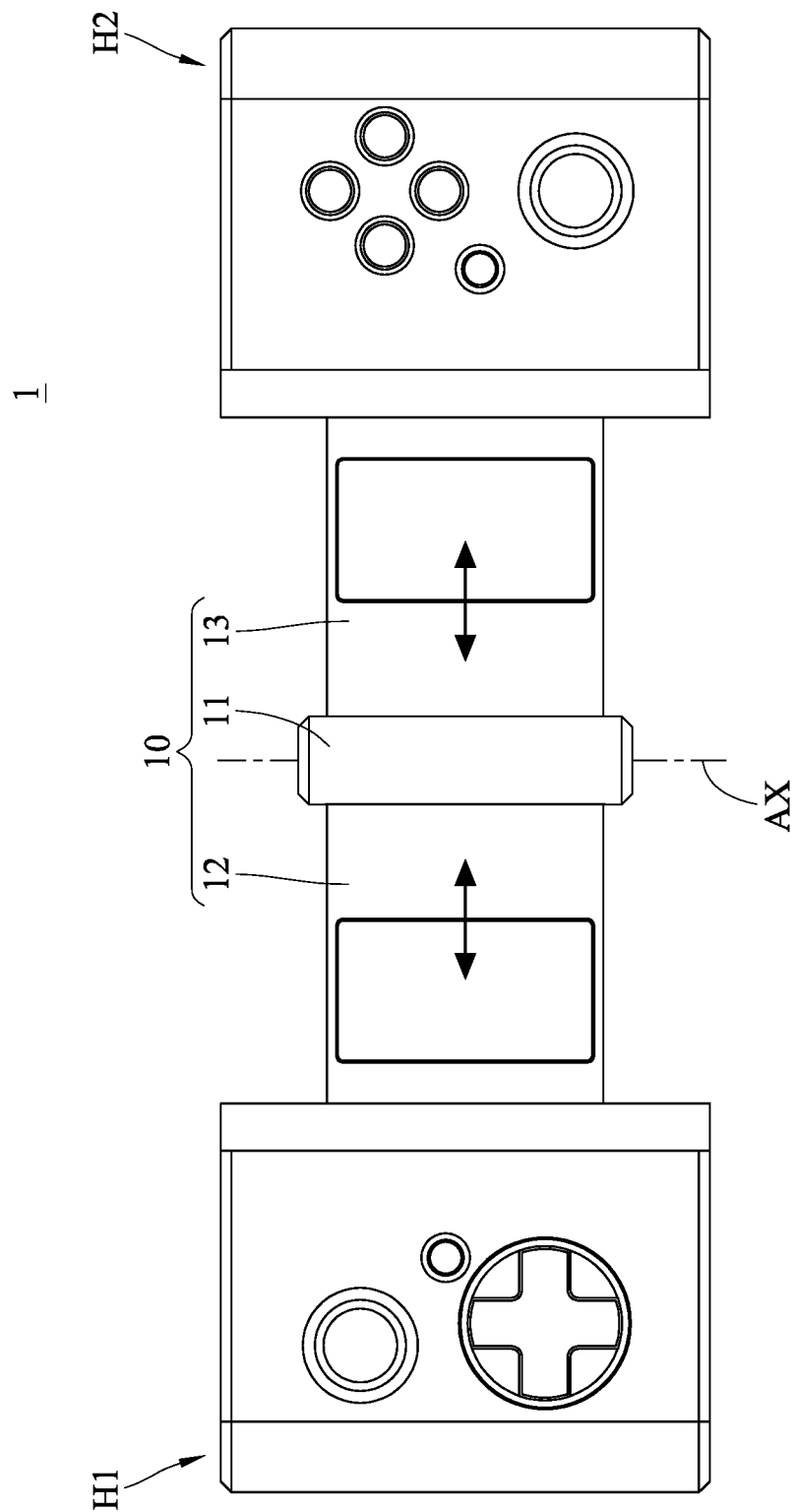
FIG. 3 is a front view of a control assembly according to one embodiment of the disclosure when in an in-use status.
Figure 4:
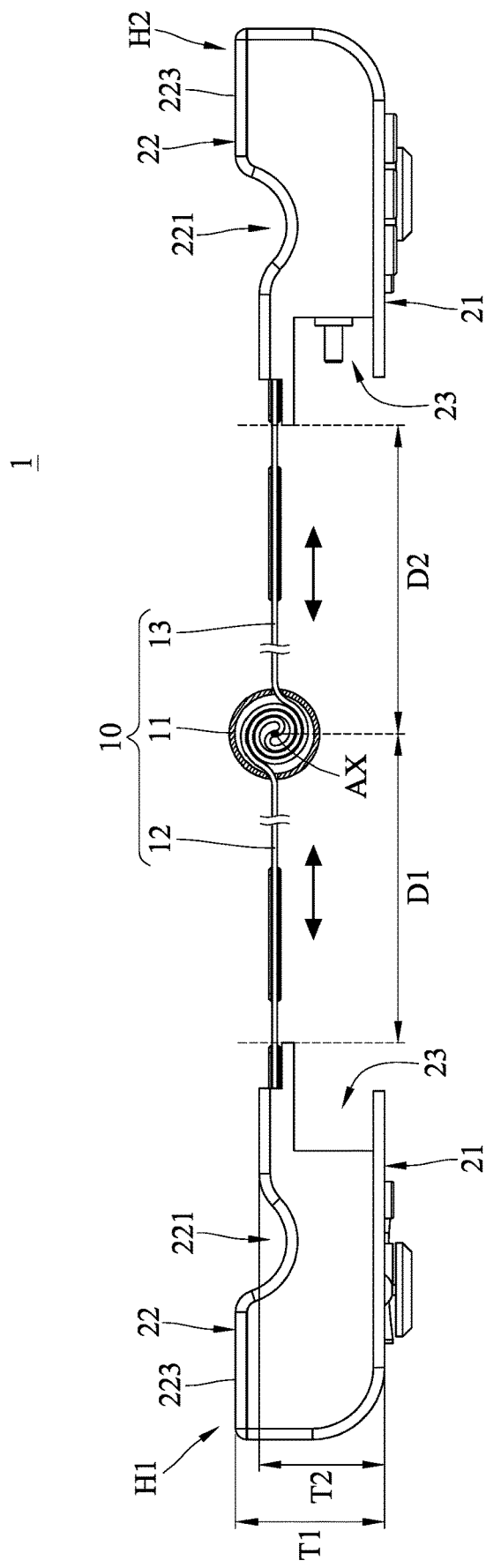
FIG. 4 is a top view of a control assembly according to one embodiment of the disclosure when in an in-use status.

The details of the control assembly 1 are given below with reference to FIG. 1 and further reference to FIGS. 2-4. In this embodiment, the link mechanism 10 of the control assembly 1 may include a retractable mechanism receptacle 11 and at least two flexible parts (e.g., a flexible part 12 and a flexible part 13 as shown). The flexible part 12 is connected between the controller H1 and the retractable mechanism receptacle 11; in other words, the controller H1 is connected to the retractable mechanism receptacle 11 via the flexible part 12. The flexible part 13 is connected between the controller H2 and the retractable mechanism receptacle 11; in other words, the controller H2 is connected to the retractable mechanism receptacle 11 via the flexible part 13. The flexible part 12 and the flexible part 13 may have the same or similar configuration. The flexible parts 12 and 13 may be made of any suitable flexible material, such as rubber, silicon, or combination thereof. In one embodiment, the flexible parts 12 and 13 are each in a strip shape. As such, the controllers H1 and H2 are movably connected to two opposite sides of the retractable mechanism receptacle 11 respectively via the flexible parts 12 and 13, and thus the position of the flexible part 12 and/or flexible part 13 is changeable.

The retractable mechanism receptacle 11 may be a hollow cylinder. At least part of each of the flexible parts 12 and 13 is retractably accommodated in the retractable mechanism receptacle 11, thus a first distance D1 between an axis AX of the retractable mechanism receptacle 11 and the controller H1 and a second distance D2 between the axis AX of the retractable mechanism receptacle 11 and the controller H2 are changeable. As such, the distance between the controllers H1 and H2 is adjustable to fit different lengths of different electronic devices. In other embodiments, the flexible parts 12 and 13 are integrally formed with each other. In another embodiment, the flexible parts 12 and 13 are two independent pieces.

The controllers H1 and H2 may be similar or the same in appearance and thus only the controller H1 will be introduced in detail below. In this embodiment, the controller H1 may include a first surface 21 and a second surface 22 opposite to each other. The first surface 21 may face toward user while the controller H1 is in an in-use status. One or more buttons may be arranged on the first surface 21. The "in-use status" means a status of the controller H1 or H2 when the controllers H1 and H2 are in positions located relatively away from each other and suitable for being held in hands to operate or control the electronic device 9. The second surface 22 may located opposite to the user when the controller H1 is in the in-use status. The controller H1 may have a recess 221 at the second surface 22 for the placement of human finger when in the in-use status. In this embodiment, the controller H1 may have a holding slot 23 located between the first surface 21 and the second surface 22 and configured to receive or accommodate part of the electronic device 9. Optionally, there may be one or more connector (not numbered) arranged in the holding slot 23 for electrically connected to the electronic device 9. It is noted that the shape and size of the holding slot 23 may be modified as required.

Optionally, the controllers H1 and H2 may each have a magnetically attractive portion 223. On the controller H1, the magnetically attractive portion 223 may be located at part of the second surface 22 away from the flexible part 12. On the controller H2, the magnetically attractive portion 223 may be located at part of the second surface 22 away from the flexible part 13. The magnetically attractive portion 223 may include any suitable magnet therein. The magnetically attractive portion 223 of the controller H1 and the magnetically attractive portion 223 of the controller H2 may have opposite poles, thus the magnetically attractive portions 223 on the controllers H1 and H2 are attracted to each other when they come close to each other.

The controllers H1 and H2 may have similar or the same thickness variation. Taking the controller H1 as an example, the controller H1 has a first thickness T1 between parts of the first surface 21 and the second surface 22 located at the magnetically attractive portion 223, the controller H1 has a second thickness T2 between parts of the first surface 21 and the second surface 22 located away from the magnetically attractive portion 223, and the second thickness T2 is thinner than the first thickness T1. In other words, the controllers H1 and H2 have thicker portion at parts with the magnetically attractive portions 223; that is, the parts of the controllers H1 and H2 located away from the magnetically attractive portions 223 are thinner.

Since the flexible parts 12 and 13 are flexible and partially retractable from the retractable mechanism receptacle 11, the position of both the controllers H1 and H2 can be changed into a folded status when the control assembly 1 is not installed on the electronic device 9.

Figure 5:
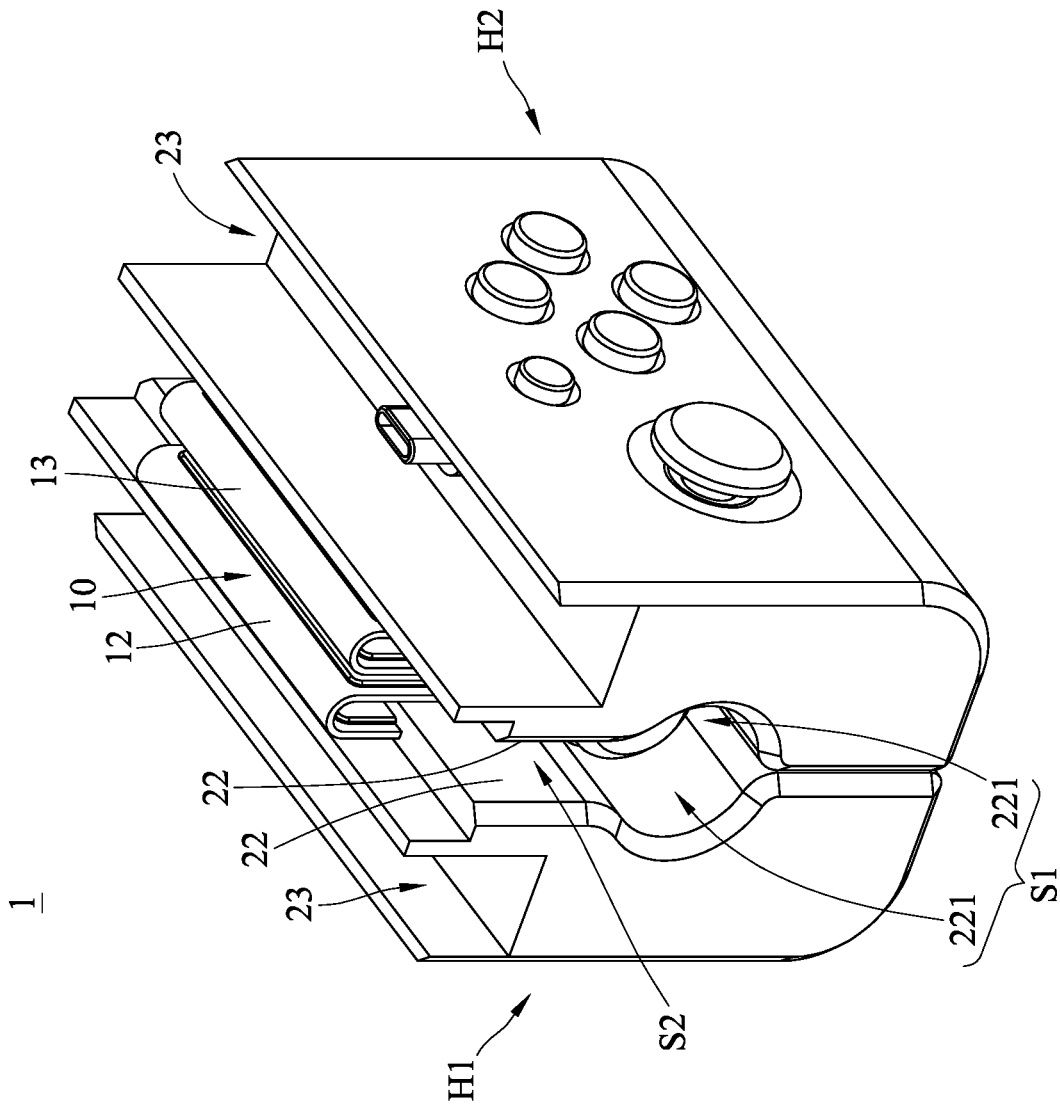
FIGS. 5-6 are different perspective views of a control assembly according to one embodiment of the disclosure when in folded status.
Figure 6:
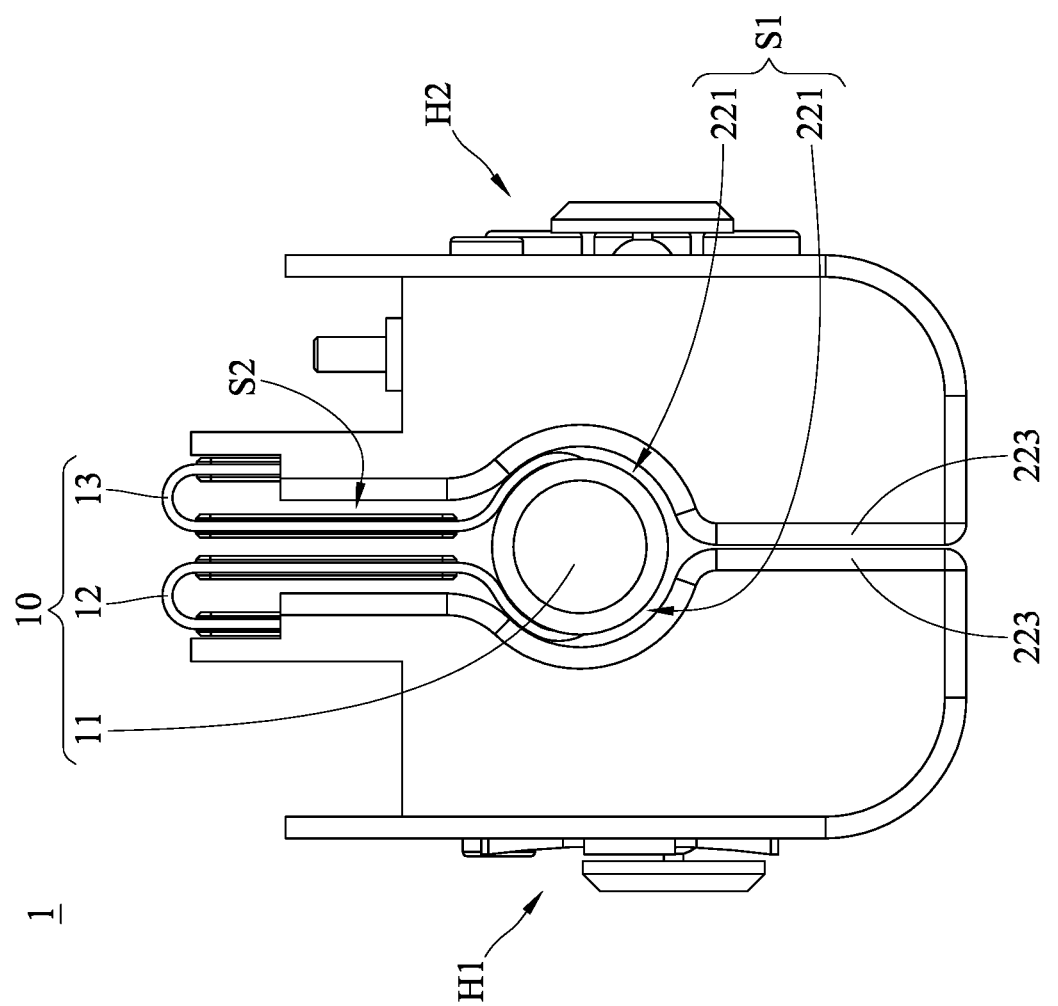

Please further refer to FIGS. 5-6, as shown, by deforming the flexible parts 12 and 13, the second surfaces 22 of the controllers H1 and H2 may contact each other. In specific, by deforming the flexible parts 12 and 13, the magnetically attractive portions 223 of the controllers H1 and H2 can be in contact with each other and therefore are attracted to each other to keep the second surfaces 22 of the controllers H1 and H2 contacting each other.

Meanwhile, the recesses 221 on the second surfaces 22 may together form a first accommodation space S1 configured for accommodating the retractable mechanism receptacle 11. Thus, the recess 221 of the controller H1 and the recess 221 of the controller H2 may each have a contour mating part of the retractable mechanism receptacle 11. Also, as, discussed, the thickness between the parts of the first surface 21 and the second surface 22 of the controllers H1 and H2 located away from the magnetically attractive portions 223 is thinner, thus when the magnetically attractive portions 223 of the controllers H1 and H2 contact each other, parts of the controllers H1 and H2 located away from the magnetically attractive portions 223 may together form a second accommodation space S2 configured for accommodating the two flexible parts 12 and 13. Therefore, when the control assembly 1 is switched into the folded status to make the controllers H1 and H2 arranged side by side, the link mechanism 10 can be accommodated within the space defined between the controllers H1 and H2 so that the control assembly 1 can be transformed into a smaller and more portable size.

According to the control assembly as discussed in the above embodiments of the disclosure, the controllers, which are able to be installed on a portable electronic device, are connected to each other by the link mechanism and the link mechanism has flexible parts retractably stored in the retractable mechanism receptacle, thus the distance between the controllers is adjustable to adopt lengths of different electronic devices, and the control assembly is able to be transformed into a smaller and more portable size by folding the flexible parts and changing the relationships between the controllers and the link mechanism.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A control assembly, adapted for an electronic device, comprising:
    two controllers configured to be removably installed on the electronic device; and
    a link mechanism comprising a retractable mechanism receptacle and two flexible parts, wherein the two controllers are connected to the retractable mechanism receptacle respectively via the two flexible parts, and at least part of each of the two flexible parts is retractably accommodated in the retractable mechanism receptacle;
    wherein each of the two controllers has a recess mating a contour of part of the retractable mechanism receptacle;
    wherein the control assembly has a folded status, when the control assembly is in the folded status, the recesses of the two controllers together form a first accommodation space configured for accommodating the retractable mechanism receptacle therewithin.

2. The control assembly according to claim 1, wherein each of the two controllers has a magnetically attractive portion, and the magnetically attractive portions of the two controllers are attracted to each other.

3. The control assembly according to claim 2, wherein each of the two controllers has a first surface and a second surface opposite to each other, each of the two controllers has a first thickness between parts of the first surface and the second surface located at the magnetically attractive portion, each of the two controllers has a second thickness between parts of the first surface and the second surface located away from the magnetically attractive portion, and the second thickness is thinner than the first thickness.

4. The control assembly according to claim 3, wherein the control assembly has a folded status, when the control assembly is in the folded status, parts of the two controllers located away from the magnetically attractive portions together form a second accommodation space configured for accommodating the two flexible parts therewithin.

5. The control assembly according to claim 1, wherein the two controllers each have a holding slot configured to accommodate part of the electronic device.

6. The control assembly according to claim 1, wherein the two controllers is configured to be in communication with the electronic device in a wired manner.

7. The control assembly according to claim 1, wherein the two controllers is configured to be in communication with the electronic device in a wireless manner.

8. The control assembly according to claim 1, wherein the two flexible parts are integrally formed with each other.

* * * * *